(12) United States Patent
Ge et al.

(10) Patent No.: US 11,745,862 B2
(45) Date of Patent: Sep. 5, 2023

(54) THREE-STEERING GEAR DIRECT-DRIVE COAXIAL ROTOR SYSTEM AND FLIGHT CONTROL METHOD FOR CONTROLLING COAXTAL ROTOR AIRCRAFT

(71) Applicant: Hunan Taoxun Aviation Technology Co., Ltd., Hunan (CN)

(72) Inventors: Xun Ge, Hunan (CN); Yuan Shen, Hunan (CN); Shuzhen Guo, Hunan (CN); Liangwei Li, Hunan (CN); Weidong Liu, Hunan (CN)

(73) Assignee: Hunan Taoxun Aviation Technology Co., Ltd., Hunan (CN)

( * ) Notice: Subject to any disclaimer, the term of this patent is extended or adjusted under 35 U.S.C. 154(b) by 330 days.

(21) Appl. No.: 17/335,082

(22) Filed: Jun. 1, 2021

(65) Prior Publication Data
US 2021/0284330 A1    Sep. 16, 2021

Related U.S. Application Data

(63) Continuation of application No. PCT/CN2020/126687, filed on Nov. 5, 2020.

(30) Foreign Application Priority Data

Dec. 26, 2019 (CN) .......................... 201911364527.1

(51) Int. Cl.
*B64C 27/10* (2023.01)
*B64C 27/14* (2006.01)
(Continued)

(52) U.S. Cl.
CPC .............. *B64C 27/14* (2013.01); *B64C 27/10* (2013.01); *B64C 27/605* (2013.01); *B64C 27/80* (2013.01)

(58) Field of Classification Search
CPC ........... B64C 9/00; B64C 27/10; B64C 27/14; B64C 27/605; B64C 27/80; B64C 27/52; B64C 27/12
See application file for complete search history.

(56) References Cited

U.S. PATENT DOCUMENTS

| | | | | |
|---|---|---|---|---|
| 5,370,341 | A * | 12/1994 | Leon ....................... | B64C 27/10 244/17.11 |
| 8,985,951 | B2 * | 3/2015 | Rauber ................... | B64C 27/43 416/141 |
| 2006/0102777 | A1 * | 5/2006 | Rock ....................... | B64C 27/10 244/17.25 |

FOREIGN PATENT DOCUMENTS

| | | |
|---|---|---|
| CN | 104527975 | 4/2015 |
| CN | 105270617 | 1/2016 |

(Continued)

*Primary Examiner* — Audrey B. Walter
*Assistant Examiner* — Dapinder Singh
(74) *Attorney, Agent, or Firm* — JCIP GLOBAL INC.

(57) ABSTRACT

The present application discloses a three-steering gear direct-drive coaxial rotor system and a control strategy, and belongs to the technical field of helicopter structures. The system includes an upper rotor power module, an upper rotor assembly, an upper tilting mechanism, a driving steering gear group assembly, a lower tilting mechanism, a lower rotor assembly, a lower rotor power module, an upper fixing mast, and a lower fixing mast. According to the present application, three steering gears directly drives an upper-layer swashplate and a lower-layer swashplate, to make cyclic pitch and add-subtract collective pitch on rotors. The synchronous tilting mechanism of the present application provides a flexible design solution for the characteristic of cyclic pitch phase angle offset of the rotors gear.

11 Claims, 3 Drawing Sheets

(51) Int. Cl.
 *B64C 27/80* (2006.01)
 *B64C 27/605* (2006.01)

(56) References Cited

FOREIGN PATENT DOCUMENTS

| | | |
|---|---|---|
| CN | 106428542 | 2/2017 |
| CN | 109552614 | 4/2019 |
| CN | 110979660 | 4/2020 |
| WO | 2018139694 | 8/2018 |

* cited by examiner

THREE-STEERING GEAR DIRECT-DRIVE COAXIAL ROTOR SYSTEM AND FLIGHT CONTROL METHOD FOR CONTROLLING COAXTAL ROTOR AIRCRAFT

CROSS-REFERENCE TO RELATED APPLICATION

The present application is a continuation of international application of PCT application No. PCT/CN2020/126687 filed on Nov. 5, 2020, which claims the priority benefit of China application No. 201911364527.1 filed on Dec. 26, 2019. The entirety of the above-mentioned patent applications is incorporated herein by reference and made a part of this specification.

BACKGROUND

Technical Field

The present application relates to the field of helicopters, and in particular, to a three-steering gear direct-drive coaxial rotor system and a control strategy.

Description of Related Art

The coaxial dual-rotor aircraft does not need a tail rotor to provide balance torque, and antitorque of the upper rotor and the lower rotor are counteracted. Compared to single-rotor helicopters and multi-rotor aircrafts, the coaxial dual-rotor aircraft has smaller volume and even smaller accommodating volume. Compared to multi-rotor aircrafts, the coaxial dual-rotor aircraft also has higher energy utilization rate, and is becoming increasingly important in the field of air monitoring, load transportation, and the like.

Although a coaxial double-rotor aircraft has many advantages, the disclosed coaxial aircraft with single-layer cyclic pitch control has poor wind resistance due to insufficient steering force for flight. Alternatively, in order to obtain a sufficient steering force, the pitch mechanism of the other disclosed coaxial aircraft is too complicated in design.

SUMMARY

The present application aims to overcome the problems described above and provides a three-steering gear direct-drive coaxial rotor system and a control strategy.

To achieve the objectives, the embodiments of the present application adopt the following technical solutions: a three-steering gear direct-drive coaxial rotor system, including an upper rotor power module, an upper rotor assembly, an upper tilting mechanism, a driving steering gear group assembly, a lower tilting mechanism, a lower rotor assembly, a lower rotor power module, an upper fixing mast, and a lower fixing mast. The upper tilting mechanism includes an upper swashplate, an upper rotating swashplate, an upper synchronous link and an upper pitch link. The driving steering gear group assembly includes an upper fastener, a steering gear group consisting of three steering gears, a horn, a center seat, an upper swashplate positioner, a lower fastener and a lower swashplate positioner. The lower tilting mechanism includes a lower swashplate, a lower rotating swashplate, a lower synchronous link and a lower pitch link. The upper fixing mast and the lower fixing mast are respectively mounted on the upper fastener and the lower fastener in the driving steering gear group assembly to form a basic framework of the aircraft and a rotating shaft around which a rotor rotates. The upper rotor power module is arranged at an uppermost position of the coaxial rotor system. The upper rotor assembly is mounted below the upper rotor power module, the upper tilting mechanism is mounted below the upper rotor assembly, the driving steering gear group assembly is mounted below the upper tilting mechanism, the lower tilting mechanism is mounted below the driving steering gear group assembly, the lower rotor assembly is mounted below the lower tilting mechanism, and the lower rotor power module is mounted below the lower rotor assembly. The steering gear group consisting of the three steering gears is fixedly connected to three different positions of the center seat, one ends of the three horns are fixedly connected to a torque output shaft of the steering gear, and one ends of the three upper synchronous links and one ends of the three lower synchronous links are respectively hinged to the other ends of the three horns. The other ends of the three upper synchronous links are hinged to three side extension rods of the upper swashplate. The other ends of the three lower synchronous links are hinged to three side extension rods of the lower swashplate. The steering gear group consisting of the three steering gears directly drives the upper swashplate and the lower swashplate. The side extension rod of the upper swashplate is connected to the center seat through the upper swashplate positioner or a synchronizer, to limit the circumferential rotation of the upper swashplate. The side extension rod of the lower swashplate is connected to the center seat through the lower swashplate positioner or a synchronizer, to limit the circumferential rotation of the lower swashplate.

Preferably, the positions of the connecting point of the upper swashplate and the connecting point of a corresponding horn form a deflection angle which is more than or equal to 0° and less than 90° circumferentially around the rotating shaft in a top view; the connecting point of the lower swashplate and the connecting point of a corresponding horn form a deflection angle which is equal in size and opposite in direction circumferentially around the rotating shaft in a top view than that of the upper swashplate, so that the deflection angles adapt to the condition of any phase angle of 90° or less than 90° generated by the upper rotor assembly and the lower rotor assembly in the process of cyclic pitch control.

Preferably, the upper rotor assembly includes an upper rotor, an upper rotor clamp, an upper rotor pitch and an upper hub. The lower rotor assembly includes a lower rotor, a lower rotor clamp, a lower rotor pitch and a lower hub. The upper rotor assembly is a symmetric and uniformly-distributed structure with two-blade rotors or multi-blade rotors, the root portion of the upper rotor is hinged to one end of the upper rotor clamp, the other end of the upper rotor clamp is hinged to the upper rotor pitch, and the upper rotor pitch is hinged to the upper hub. The upper hub rotates circumferentially about the upper fixing mast. The upper rotor power module drives the upper hub directly or through a reduction gear and drives the upper rotor assembly to rotate. The lower rotor assembly is a symmetric structure with two-blade rotors, the root portion of the lower rotor is hinged to one end of the lower rotor clamp, the other end of the lower rotor clamp is hinged to the lower rotor pitch, and the lower rotor pitch is hinged to the lower hub. The lower hub rotates circumferentially about the lower fixing mast. The lower rotor power module drives the lower hub directly or through a reduction gear and drives the lower rotor assembly to rotate. The upper rotor power module and the lower rotor power module are respectively and fixedly mounted at the upper end of the upper fixing mast and the lower end of a lower fixing mast.

Preferably, central portions of the upper rotating swashplate and the upper swashplate are assembled through a bearing, the center of the upper swashplate is in spherical hinge connection with the upper fixing mast and slides on the upper fixing mast, the upper rotating swashplate is hinged to one end of the upper pitch link, and the other end of the upper pitch link is hinged to the side extension rod of the upper rotor pitch. Central portions of the lower rotating swashplate and the lower swashplate are assembled through a bearing, the center of the lower swashplate is in spherical hinge connection with the lower fixing mast and slides on the lower fixing mast, the lower rotating swashplate is hinged to one end of the lower pitch link, and the other end of the lower pitch link is hinged to the side extension rod of the lower rotor pitch. The upper pitch link and the lower pitch link are restrained by an upper circumferential synchronizer and a lower circumferential synchronizer to respectively drive the upper rotating swashplate and the upper rotor assembly as well as the lower rotating swashplate and the lower rotor assembly to make a synchronous and circumferential movement.

Preferably, the upper circumferential synchronizer and the lower circumferential synchronizer of the upper pitch link and the lower pitch link are integrated with the upper pitch link and the lower pitch link as integrated parts, or the upper circumferential synchronizer and the lower circumferential synchronizer of the upper pitch link and the lower pitch link are disengaged from the upper pitch link and the lower pitch link, and are respectively connected to the upper hub and the upper rotating swashplate, as well as the lower hub and the lower rotating swashplate, as independent parts.

Preferably, one end of the upper fastener is fixedly connected to the upper fixing mast, and the other end of the upper fastener is fixedly connected to the center seat; one end of the lower fastener is fixedly connected to the lower fixing mast, and the other end of the lower fastener 4h is fixedly connected to the center seat 4f; or the upper fastener and the lower fastener are integrated parts with the central seat.

Preferably, the upper fixing mast and the lower fixing mast are two independent shafts, or are an integrated shaft.

Preferably, the steering gear group is composed of a servo device in a rotary output form, or a servo device in a linear output form.

Preferably, the upper rotor power module and lower rotor power module are selected from any of direct drive or deceleration drive, electric or hydraulic drive, dual power or single power module.

The present application also provides a flight control strategy for controlling a coaxial rotor aircraft, including the following steps: a steering gear group consisting of three steering gears directly drives and adjusts yaw angles of an upper-layer swashplate and a lower-layer swashplate, to make cyclic pitch adjustment of an upper rotor and a lower rotor, and to control roll and pitch motions of the aircraft. The steering gear group consisting of three steering gears directly drives central heights of an upper swashplate and a lower swashplate, to make collective pitch adjustment of the upper rotor and the lower rotor, and to control heave motion of the aircraft; and the rotational speed of the upper rotor and the lower rotor are adjusted differentially, to control yaw motion of the aircraft.

Beneficial Effects: The pitch mechanism and the control strategy thereof according to the present application achieve double-layer cyclic pitch and add-subtract collective pitch control. Compared with a disclosed single-layer cyclic pitch coaxial aircraft, the coaxial rotor system has more sufficient steering efficiency and higher wind resistance; compared with a disclosed double-layer cyclic pitch coaxial aircraft, the coaxial rotor system has fewer steering gears and a simpler structure.

The present application achieves double-layer cyclic pitch and double-layer add-subtract collective pitch by fewer steering gears and simplified structures, provides sufficient steering force for flight maneuverability, efficiently exerts the maneuvering performance and wind resistance of the aircraft.

The present application also provides a more simplified implementation method for the condition that the phase angle of the rotor is less than 90°, so that the structure is more reliable and lighter.

DESCRIPTION OF THE EMBODIMENTS

Hereinafter, the present application is further illustrated with reference to the accompanying drawings and specific embodiments. These embodiments are practiced on the premise of the technical solutions of the present application. It should be understood that, these embodiments are merely used for explaining the present application and not intended to limit the protection scope of the present application.

Embodiment 1

Figure 1:
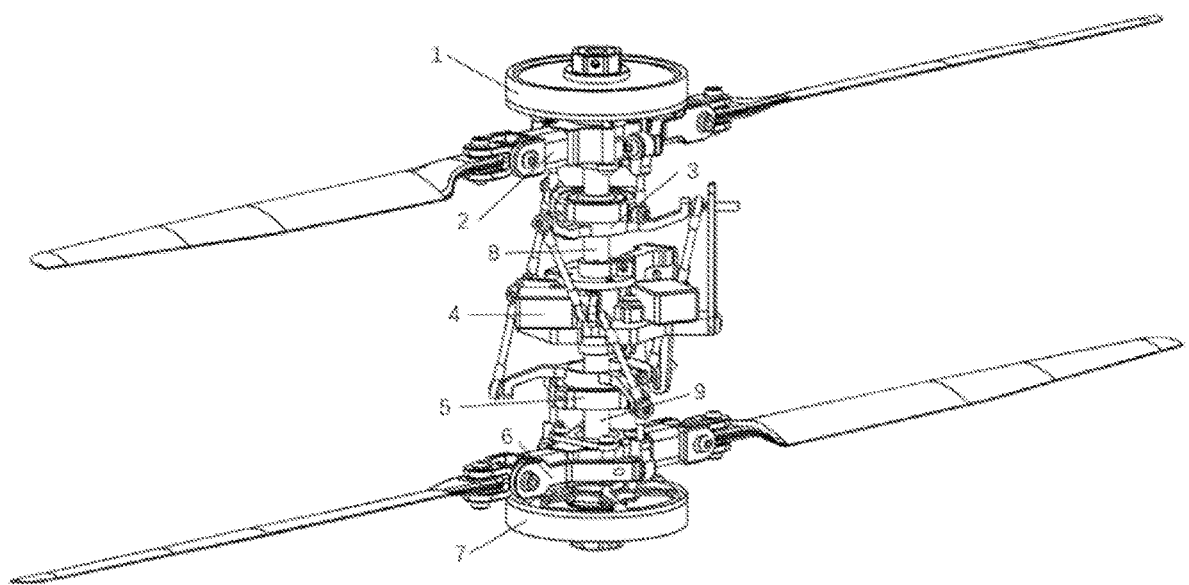
FIG. 1 is a general schematic diagram of a three-steering gear direct-drive coaxial rotor system.

As shown in FIG. 1, a three-steering gear direct-drive coaxial rotor system includes an upper rotor power module 1, an upper rotor assembly 2, an upper tilting mechanism 3, a driving steering gear group assembly 4, a lower tilting mechanism 5, a lower rotor assembly 6, a lower rotor power module 7, an upper fixing mast 8 and a lower fixing mast 9. The upper tilting mechanism 3 includes an upper swashplate 3a, an upper rotating swashplate 3b, an upper synchronous link 3d and an upper pitch link 3c. The driving steering gear group assembly 4 includes an upper fastener 4a, a steering gear group 4b consisting of three steering gears, a horn 4e, a center seat 4f, an upper swashplate positioner 4g, a lower fastener 4h and a lower swashplate positioner 4i. The lower tilting mechanism 5 includes a lower swashplate 5a, a lower rotating swashplate 5b, a lower synchronous link 5d and a lower pitch link 5c. The upper fixing mast 8 and the lower fixing mast 9 are respectively mounted on the upper fastener 4a and the lower fastener 4h in the driving steering gear group assembly 4 to form a basic framework of the aircraft and a rotating shaft around which a rotor rotates. The upper rotor power module 1 is arranged at the uppermost position of the coaxial rotor system. The upper rotor assembly 2 is mounted below the upper rotor power module 1, the upper tilting mechanism 3 is mounted below the upper rotor assembly 2, the driving steering gear group assembly 4 is mounted below the upper tilting mechanism 3, the lower tilting mechanism 5 is mounted below the driving steering gear group assembly 4, the lower rotor assembly 6 is mounted below the lower tilting mechanism 5, and the lower rotor power module 7 is mounted below the lower rotor assembly 6.

Figure 2:
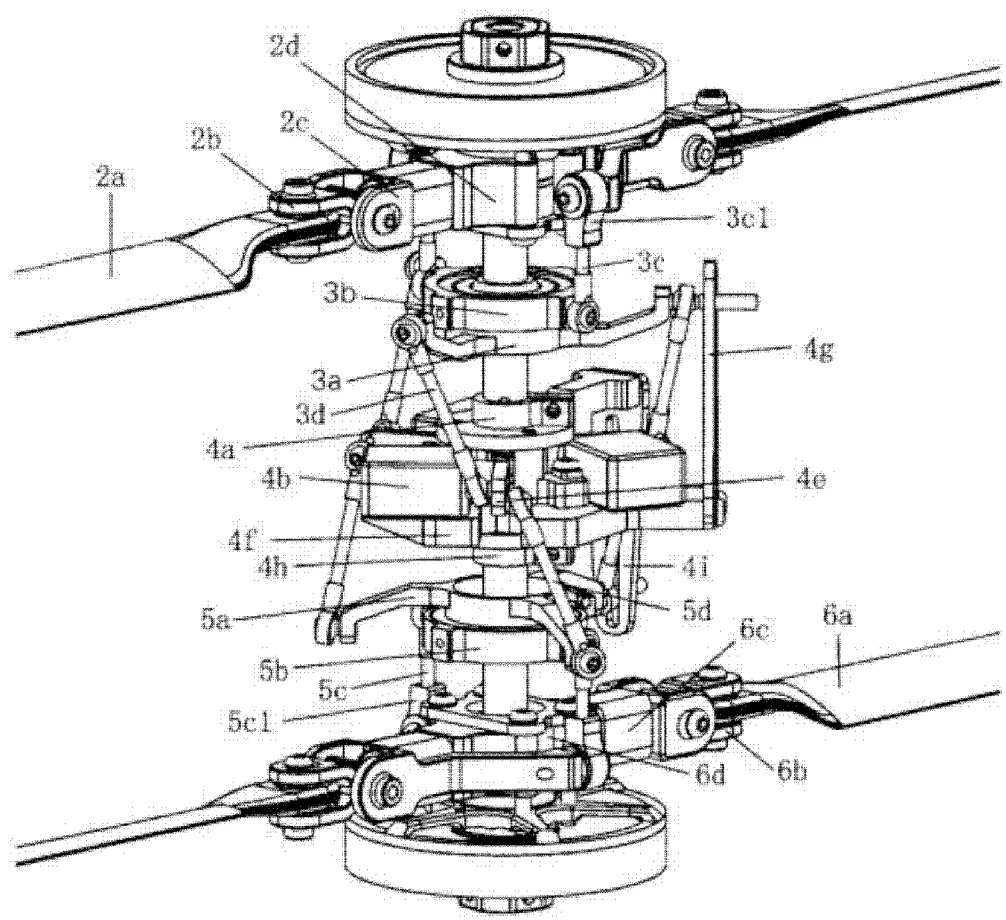
FIG. 2 is a detailed schematic diagram of a first configuration of a three-steering gear direct-drive coaxial rotor system.
Figure 3:
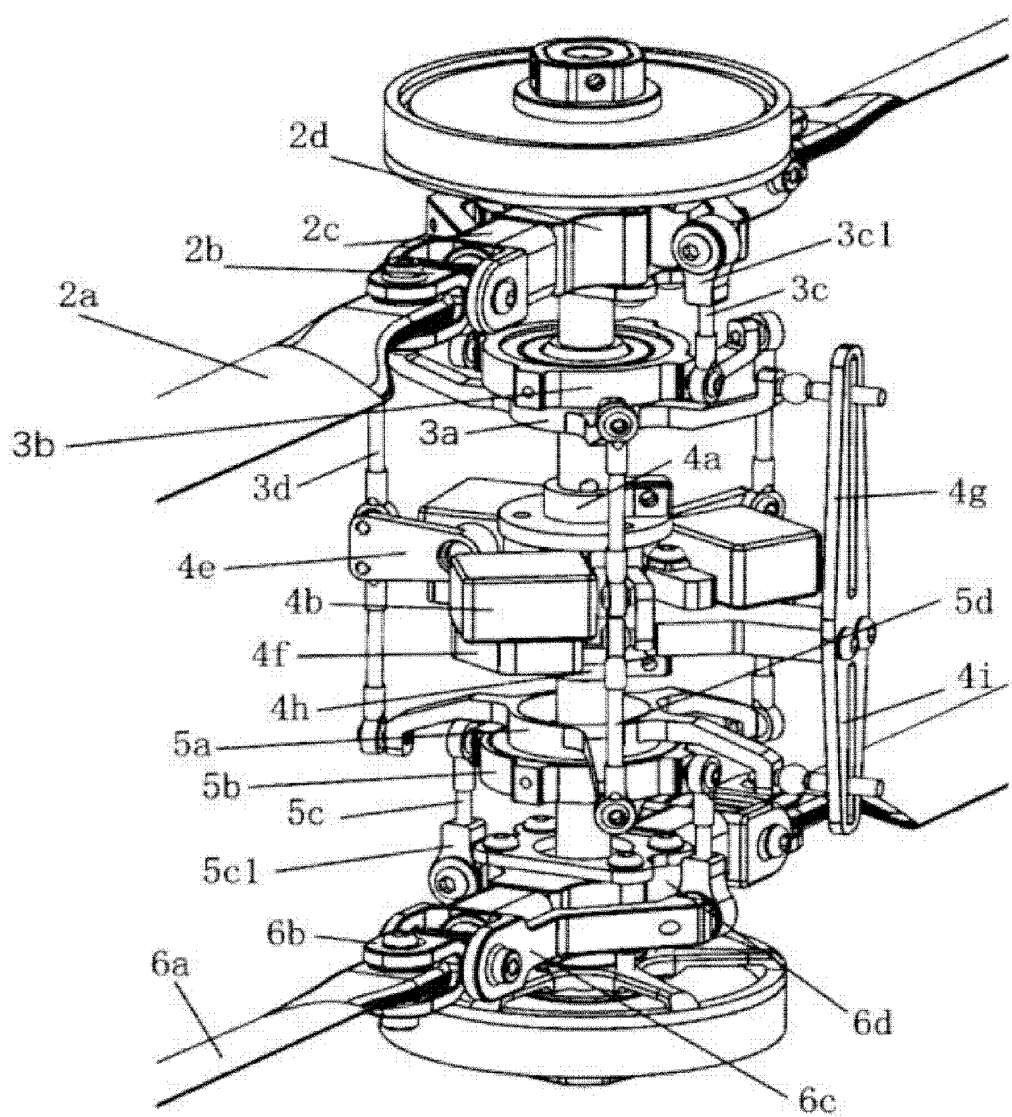
FIG. 3 is a detailed schematic diagram of a second configuration of a three-steering gear direct-drive coaxial rotor system.

As shown in FIG. 2 and FIG. 3, the steering gear group 4b consisting of the three steering gears is fixedly connected to three different positions of the center seat 4f, one ends of the three horns 4e are fixedly connected to a torque output shaft of the steering gear, and one ends of the three upper synchronous links 3d and one ends of the three lower synchronous links 5d are respectively hinged to the other ends of the three horns 4e. The other ends of the three upper synchronous links 3d are hinged to three side extension rods of the upper swashplate 3a. The other ends of the three lower synchronous links 5d are hinged to three side extension rods of the lower swashplate 5a. The steering gear group 4b consisting of the three steering gears directly drives the upper swashplate 3a and the lower swashplate 5a. The side extension rod of the upper swashplate 3a is connected to the center seat 4f through the upper swashplate positioner 4g or a synchronizer, to limit the circumferential rotation of the upper swashplate 3a. The side extension rod of the lower swashplate 5a is connected to the center seat 4f through the lower swashplate positioner 4i or a synchronizer, to limit the circumferential rotation of the lower swashplate 5a.

As shown in FIG. 2 and FIG. 3, the positions of the connecting point of the upper swashplate 3a and the connecting point of a corresponding horn 4e form a deflection angle which is more than or equal to 0° and less than 90° circumferentially around the rotating shaft in a top view. The connecting point of the lower swashplate 5a and the connecting point of a corresponding horn 4e form a deflection angle which is equal in size and opposite in direction circumferentially around the rotating shaft in a top view than that of the upper swashplate 3a, so that the deflection angles adapt to the condition of any phase angle of 90° or less than 90° generated by the upper rotor assembly 2 and the lower rotor assembly 6 in the process of cyclic pitch control.

As shown in FIG. 2 and FIG. 3, the upper rotor assembly 2 includes an upper rotor 2a, an upper rotor clamp 2b, an upper rotor pitch 2c and an upper hub 2d. The lower rotor assembly 6 includes a lower rotor 6a, a lower rotor clamp 6b, a lower rotor pitch 6c and a lower hub 6d. The upper rotor assembly 2 is a symmetric and uniformly-distributed structure with two-blade rotors or multi-blade rotors, the root portion of the upper rotor 2a is hinged to one end of the upper rotor clamp 2b, the other end of the upper rotor clamp 2b is hinged to the upper rotor pitch 2c, and the upper rotor pitch 2c is hinged to the upper hub 2d. The upper hub 2d rotates circumferentially about the upper fixing mast 8. The upper rotor power module 1 drives the upper hub 2d directly or through a reduction gear and drives the upper rotor assembly 2 to rotate. The lower rotor assembly 6 is a symmetric structure with two-blade rotors, the root portion of the lower rotor 6a is hinged to one end of the lower rotor clamp 6b, the other end of the lower rotor clamp 6b is hinged to the lower rotor pitch 6c, and the lower rotor pitch 6c is hinged to the lower hub 6d. The lower hub 6d rotates circumferentially about the lower fixing mast 9. The lower rotor power module 7 drives the lower hub 6d directly or through a reduction gear and drives the lower rotor assembly 6 to rotate. The upper rotor power module 1 and the lower rotor power module 7 are respectively and fixedly mounted at the upper end of the upper fixing mast 8 and the lower end of a lower fixing mast 9.

As shown in FIG. 2 and FIG. 3, central portions of the upper rotating swashplate 3b and the upper swashplate 3a are assembled through a bearing, the center of the upper swashplate 3a is in spherical hinge connection with the upper fixing mast 8 and slides on the upper fixing mast 8, the upper rotating swashplate 3b is hinged to one end of the upper pitch link 3c, and the other end of the upper pitch link 3c is hinged to the side extension rod of the upper rotor pitch 2c. Central portions of the lower rotating swashplate 5b and the lower swashplate 5a are assembled through a bearing, the center of the lower swashplate 5a is in spherical hinge connection with the lower fixing mast 9 and slides on the lower fixing mast 9, the lower rotating swashplate 5b is hinged to one end of the lower pitch link 5c, and the other end of the lower pitch link 5c is hinged to the side extension rod of the lower rotor pitch 5c. The upper pitch link 3c and the lower pitch link 5c are restrained by an upper circumferential synchronizer 3c1 and a lower circumferential synchronizer 5c1 to respectively drive the upper rotating swashplate 3b and the upper rotor assembly 2 as well as the lower rotating swashplate 5b and the lower rotor assembly 6 to make a synchronous and circumferential movement.

In this embodiment, the upper circumferential synchronizer 3c1 and the lower circumferential synchronizer 5c1 of the upper pitch link 3c and the lower pitch link 5c also can be disengaged from the upper pitch link 3c and the lower pitch link 5c, and the upper circumferential synchronizer 3c1 and the lower circumferential synchronizer 5c1 are respectively connected to the upper hub 2d and the upper rotating swashplate 3b, as well as the lower hub 6d and the lower rotating swashplate 5b, as independent parts.

In this embodiment, one end of the upper fastener 4a is fixedly connected to the upper fixing mast 8, and the other end of the upper fastener 4a is fixedly connected to the center seat 4f. One end of the lower fastener 4h is fixedly connected to the lower fixing mast 9, and the other end of the lower fastener 4h is fixedly connected to the center seat 4f. The upper fastener 4a and the lower fastener 4h also can be designed partially or wholly as integrated parts with the central seat 4f to simplify the number of structural parts.

In this embodiment, the upper fixing mast 8 and the lower fixing mast 9 can be two independent shafts, or can be an integrated shaft.

In this embodiment, the steering gear group 4b can be composed of a servo device in a rotary output form, or a servo device in a linear output form.

In this embodiment, the upper rotor power module 1 and lower rotor power module 7 can be any of direct drive or deceleration drive, electric or hydraulic drive, dual power or single power module.

In this embodiment, the upper rotor 2a and the lower rotor 6a are not limited to be folded or not, if folded, the folded manner can be any of transverse one-sided folding, transverse Z-shaped folding, longitudinal folding, and the like.

In this embodiment, a control strategy can be used to control the coaxial dual rotor system, which includes the following steps:

a steering gear group 4b consisting of three steering gears directly drives and adjusts yaw angles of an upper-layer swashplate and a lower-layer swashplate, to make cyclic pitch adjustment of an upper rotor 2a and a lower rotor 6a, and to control roll and pitch motions of the aircraft. The steering gear group 4b consisting of three steering gears directly drives central heights of an upper swashplate and a lower swashplate, to make collective pitch adjustment of the upper rotor 2a and the lower rotor 6a, and to control heave motion of the aircraft; and the rotational speed of the upper rotor 2a and the lower rotor 6a are adjusted differentially, to control yaw motion of the aircraft.

The technical means disclosed in the present application are not limited to the technical means disclosed by the above technical means, and also include the technical solutions of any combination of the above technical features. Although certain specific embodiments are described above for instructional purposes, it will be apparent to those skilled in the art that various modifications and variations can be made without departing from the principles of the present application. These modifications and variations are also considered to be within the scope of the present application.

What is claimed is:

1. A three-steering gear direct-drive coaxial rotor system, comprising an upper rotor power module, an upper rotor assembly, an upper tilting mechanism, a driving steering gear group assembly, a lower tilting mechanism, a lower rotor assembly, a lower rotor power module, an upper fixing mast, and a lower fixing mast; wherein the upper tilting mechanism comprises an upper swashplate, an upper rotating swashplate, three upper synchronous links and an upper pitch link;

the driving steering gear group assembly comprises an upper fastener, a steering gear group comprising three steering gears, a horn, a center seat, an upper swashplate positioner, a lower fastener and a lower swashplate positioner;

the lower tilting mechanism comprises a lower swashplate, a lower rotating swashplate, three lower synchronous links and a lower pitch link;

the upper fixing mast and the lower fixing mast are respectively mounted on the upper fastener and the lower fastener in the driving steering gear group assembly to form a basic framework of a coaxial rotor aircraft and a rotating shaft around which a rotor rotates;

the upper rotor power module is arranged at an uppermost position of the coaxial rotor system;

the upper rotor assembly is mounted below the upper rotor power module, the upper tilting mechanism is mounted below the upper rotor assembly, the driving steering gear group assembly is mounted below the upper tilting mechanism, the lower tilting mechanism is mounted below the driving steering gear group assembly, the lower rotor assembly is mounted below the lower tilting mechanism, and the lower rotor power module is mounted below the lower rotor assembly;

the steering gear group comprising the three steering gears is fixedly connected to three different positions of the center seat, ends of three horns are fixedly connected to a torque output shaft of the corresponding steering gear, and ends of the three upper synchronous links and ends of the three lower synchronous links are respectively hinged to the other ends of the three horns; the other ends of the three upper synchronous links are hinged to three side extension rods of the upper swashplate; the other ends of the three lower synchronous links are hinged to three side extension rods of the lower swashplate;

the steering gear group comprising the three steering gears directly drives the upper swashplate and the lower swashplate;

the side extension rod of the upper swashplate is connected to the center seat through the upper swashplate positioner or a synchronizer, to limit the circumferential rotation of the upper swashplate;

the side extension rods of the lower swashplate are connected to the center seat through the lower swashplate positioner or a synchronizer, to limit the circumferential rotation of the lower swashplate.

2. The three-steering gear direct-drive coaxial rotor system according to claim 1, wherein positions of a connecting point of the upper swashplate and a connecting point of the corresponding horn form a deflection angle which is more than or equal to 0° and less than 90° circumferentially around the rotating shaft in a top view; a connecting point of the lower swashplate and a connecting point of the corresponding horn form a deflection angle which is equal in size and opposite in direction circumferentially around the rotating shaft in a top view than that of the upper swashplate, so that the deflection angles adapt to a condition of any phase angle of 90° or less than 90° generated by the upper rotor assembly and the lower rotor assembly in a process of cyclic pitch control.

3. The three-steering gear direct-drive coaxial rotor system according to claim 1, wherein the upper rotor assembly comprises an upper rotor, an upper rotor clamp, an upper rotor pitch and an upper hub; the lower rotor assembly comprises a lower rotor, a lower rotor clamp, a lower rotor pitch and a lower hub; the upper rotor assembly is a symmetric and uniformly-distributed structure with two-blade rotors or multi-blade rotors, a root portion of the upper rotor is hinged to one end of the upper rotor clamp, the other end of the upper rotor clamp is hinged to the upper rotor pitch, and the upper rotor pitch is hinged to the upper hub; the upper hub rotates circumferentially about the upper fixing mast; the upper rotor power module drives the upper hub directly or through a reduction gear and drives the upper rotor assembly to rotate; the lower rotor assembly is a symmetric structure with two-blade rotors, a root portion of the lower rotor is hinged to one end of the lower rotor clamp, the other end of the lower rotor clamp is hinged to the lower rotor pitch, and the lower rotor pitch is hinged to the lower hub; the lower hub rotates circumferentially about the lower fixing mast; the lower rotor power module drives the lower hub directly or through a reduction gear and drives the lower rotor assembly to rotate; the upper rotor power module and the lower rotor power module are respectively and fixedly mounted at an upper end of the upper fixing mast and a lower end of a lower fixing mast.

4. The three-steering gear direct-drive coaxial rotor system according to claim 1, wherein central portions of the upper rotating swashplate and the upper swashplate are assembled through a bearing, the center of the upper swashplate is in spherical hinge connection with the upper fixing mast and slides on the upper fixing mast, the upper rotating swashplate is hinged to one end of the upper pitch link, and the other end of the upper pitch link is hinged to the side extension rod of the upper rotor pitch; central portions of the lower rotating swashplate and the lower swashplate are assembled through a bearing, a center of the lower swashplate is in spherical hinge connection with the lower fixing mast and slides on the lower fixing mast, the lower rotating swashplate is hinged to one end of the lower pitch link, and the other end of the lower pitch link is hinged to a side extension rod of a lower rotor pitch; the upper pitch link and the lower pitch link are restrained by an upper circumferential synchronizer and a lower circumferential synchronizer to respectively drive the upper rotating swashplate and the upper rotor assembly as well as the lower rotating swashplate and the lower rotor assembly to make a synchronous and circumferential movement.

5. The three-steering gear direct-drive coaxial rotor system according to claim 4, wherein the upper circumferential synchronizer and the lower circumferential synchronizer of the upper pitch link and the lower pitch link are integrated with the upper pitch link and the lower pitch link as integrated parts, or the upper circumferential synchronizer and the lower circumferential synchronizer of the upper pitch link and the lower pitch link are disengaged from the upper pitch link and the lower pitch link, and are respectively connected to an upper hub and the upper rotating swashplate, as well as a lower hub and the lower rotating swashplate, as independent parts.

6. The three-steering gear direct-drive coaxial rotor system according to claim 1, wherein one end of the upper fastener is fixedly connected to the upper fixing mast, and the other end of the upper fastener is fixedly connected to the center seat; one end of the lower fastener is fixedly connected to the lower fixing mast, and the other end of the lower fastener is fixedly connected to the center seat; or the upper fastener and the lower fastener are integrated parts with the central seat.

7. The three-steering gear direct-drive coaxial rotor system according to claim 1, wherein the upper fixing mast and the lower fixing mast are two independent shafts, or are an integrated shaft.

8. The three-steering gear direct-drive coaxial rotor system according to claim 1, wherein the steering gear group comprises a servo device in a rotary output form, or a servo device in a linear output form.

9. The three-steering gear direct-drive coaxial rotor system according to claim 1, wherein each of the upper rotor power module and the lower rotor power module comprises a direct drive, a deceleration drive, an electric drive, a hydraulic drive, a dual power module or a single power module.

10. The three-steering gear direct-drive coaxial rotor system according to claim 1, wherein the upper rotor and the lower rotor are structures folded, a folded manner is any one of transverse one-sided folding, transverse Z-shaped folding and longitudinal folding.

11. A flight control method for controlling coaxial rotor aircraft according to claim 1, comprising:

directly driving and adjusting, by the steering gear group comprising three steering gears, yaw angles of an upper-layer swashplate and a lower-layer swashplate, to make cyclic pitch adjustment of the upper rotor and the lower rotor, and to control roll and pitch motions of the coaxial rotor aircraft;

directly driving central heights of the upper swashplate and the lower swashplate, by the steering gear group comprising three steering gears, to make collective pitch adjustment of the upper rotor and the lower rotor, and to control heave motion of the coaxial rotor aircraft; and differentially adjusting a rotational speed of the upper rotor and the lower rotor, to control yaw motion of the coaxial rotor aircraft.

\* \* \* \* \*